United States Patent [19]

Westerberg et al.

[11] Patent Number: 5,349,502

[45] Date of Patent: Sep. 20, 1994

[54] UNIVERSAL LATTICE FOR MAGNETIC ELECTRONIC ARTICLE SURVEILLANCE SYSTEM

[75] Inventors: Roger K. Westerberg, Cottage Grove; Thomas J. Brace, Minneapolis, both of Minn.

[73] Assignee: Minnesota Mining and Manufacturing Company, St. Paul, Minn.

[21] Appl. No.: 55,147

[22] Filed: Apr. 29, 1993

[51] Int. Cl.⁵ .............................................. H02B 1/01
[52] U.S. Cl. .................................... 361/829; 340/572; 340/541
[58] Field of Search ............... 361/417, 418, 419, 420, 361/429; 340/568, 572, 540, 541, 551, 552, 561, 565, 566, 567; 248/158, 159, 200, 351

[56] References Cited

U.S. PATENT DOCUMENTS

| | | | |
|---|---|---|---|
| 4,509,039 | 4/1985 | Dowdle | 340/572 |
| 4,677,799 | 7/1987 | Zarembo | 52/220 |
| 4,994,939 | 2/1991 | Rubertus et al. | 361/429 |
| 5,103,235 | 4/1992 | Clemens | 340/572 |

*Primary Examiner*—Leo P. Picard
*Assistant Examiner*—Bot Ledynh
*Attorney, Agent, or Firm*—Gary L. Griswold; Walter N. Kirn; Kari H. Bartingale

[57] ABSTRACT

A universal lattice assembly for use in a magnetic-type electronic article surveillance system is disclosed which comprises a frame formed of two identical molded plastic half-shells, a metal chassis within which specific electronic sub-assemblies may be positioned and a coil assembly including a field-producing coil and a detector coil. The frame includes a substantially continuous series of tabs and notches which are positioned to be inter-connected as the half-shells are pressed together, the resulting assembly becoming dimensionally rigid, thus firmly anchoring a coil assembly in place, preventing any relative movement as the assembled unit may be jostled in operation.

16 Claims, 4 Drawing Sheets

UNIVERSAL LATTICE FOR MAGNETIC ELECTRONIC ARTICLE SURVEILLANCE SYSTEM

FIELD OF THE INVENTION

The invention relates to electronic article surveillance systems in which an alternating magnetic field is applied in an interrogation zone.

BACKGROUND OF THE INVENTION

Electronic article surveillance (EAS) systems have, in recent years, become increasingly commonplace. Such systems are now installed in a majority of academic and public libraries and are so common in retail stores as to not even cause a second look.

One type of EAS system in which alternating magnetic fields are employed typically utilizes panels or lattices on both sides of an exit way, thereby defining an interrogation zone through which protected articles bearing the EAS markers must pass. Both drive coils and sense coils are generally located within each lattice. For example, U.S. Pat. No. 4,994,939 (Rubertus) discloses a previously-preferred lattice assembly for housing both types of coils side by side, and in which a nulling mechanism is provided, thereby minimizing inductive coupling between the respective coils. As the null condition is affected by both ferrous objects near the lattice and by ambient electric currents, that mechanism enables the null condition to be adjusted during installation. While that patent facilitates certain improvements in the ease of construction, ease of installation, and usefulness with various types of systems and coil configurations, it has not proven to be fully satisfactory.

SUMMARY OF THE INVENTION

In contrast to lattices supplied with prior art magnetic EAS systems, the present invention is directed to an improved and more universal, more rugged, magnetic EAS lattice assembly.

The improved universal lattice assembly of the present invention thus comprises a structural chassis having a bottom section adapted to be mounted on a floor and opposing parallel side sections rigidly secured to opposite ends of the bottom section. The lattice assembly also includes means for indexing and interlocking the chassis with other members of the assembly, together with a frame formed of two molded half shells which, when mated together, define a cavity within which may be mounted a coil assembly such as may include a drive coil and, preferably, also a detector coil.

The mated together half-shells thus form opposing spaced-apart vertical legs, a top, substantially horizontal section connected across the top of the legs, a middle section connected between the legs and spaced upward of the bottom thereof, at least one additional, substantially horizontal section extending between the legs intermediate between the top and middle sections, and a centermost vertical section connected between the respective horizontal sections.

A cavity is thus defined by and extends through the vertical legs, top section, middle section, all additional horizontal sections, and the centermost vertical section. Within the cavity are means for receiving and rigidly anchoring the coil assembly in place. The half-shells also include a substantially continuous plurality of interlocking tabs and notches extending around a major portion of the respective peripheries of each half-shell which are adapted to mate together when the half-shells are positioned facing each other and are pressed together, thereby attaching the respective half-shells together.

Finally, means are provided in the middle section for receiving portions of the respective coils and associated electronic sub-assemblies, and the like, and for mating with members of the chassis, the mating of the chassis and half-shells making up the frame thereby forming a completed composite lattice assembly of high integral strength suitable for use in a hostile-user environment without requiring additional bonding of the respective members.

Preferably, the assembly also includes a foot pad adapted to be permanently secured on a floor surface and which includes means for receiving and anchoring the chassis therein. The pad, preferably, includes a pair of upward projecting structural support pins adapted to be received into matching apertures in the chassis. Desirably, the pins are of unequal length, enabling the assembled frame and chassis to be temporarily positioned on the foot pad, adjusted for operation, and moved away from the shorter pin, allowing the pad to then be permanently attached to the floor.

And, in one embodiment, the topmost section of the frame is configured in a generally arched shape, and a topmost section of the detector coil is anchored within the cavity formed by said topmost section of the frame. The detector coil desirably comprises two sections connected in a lazy FIG. 8 configuration, thereby having two substantially vertical juxtaposed, but crossed-over, centermost sections, which sections are anchored within the cavity formed by the centermost vertical section of the frame.

DETAILED DESCRIPTION

Figure 1:
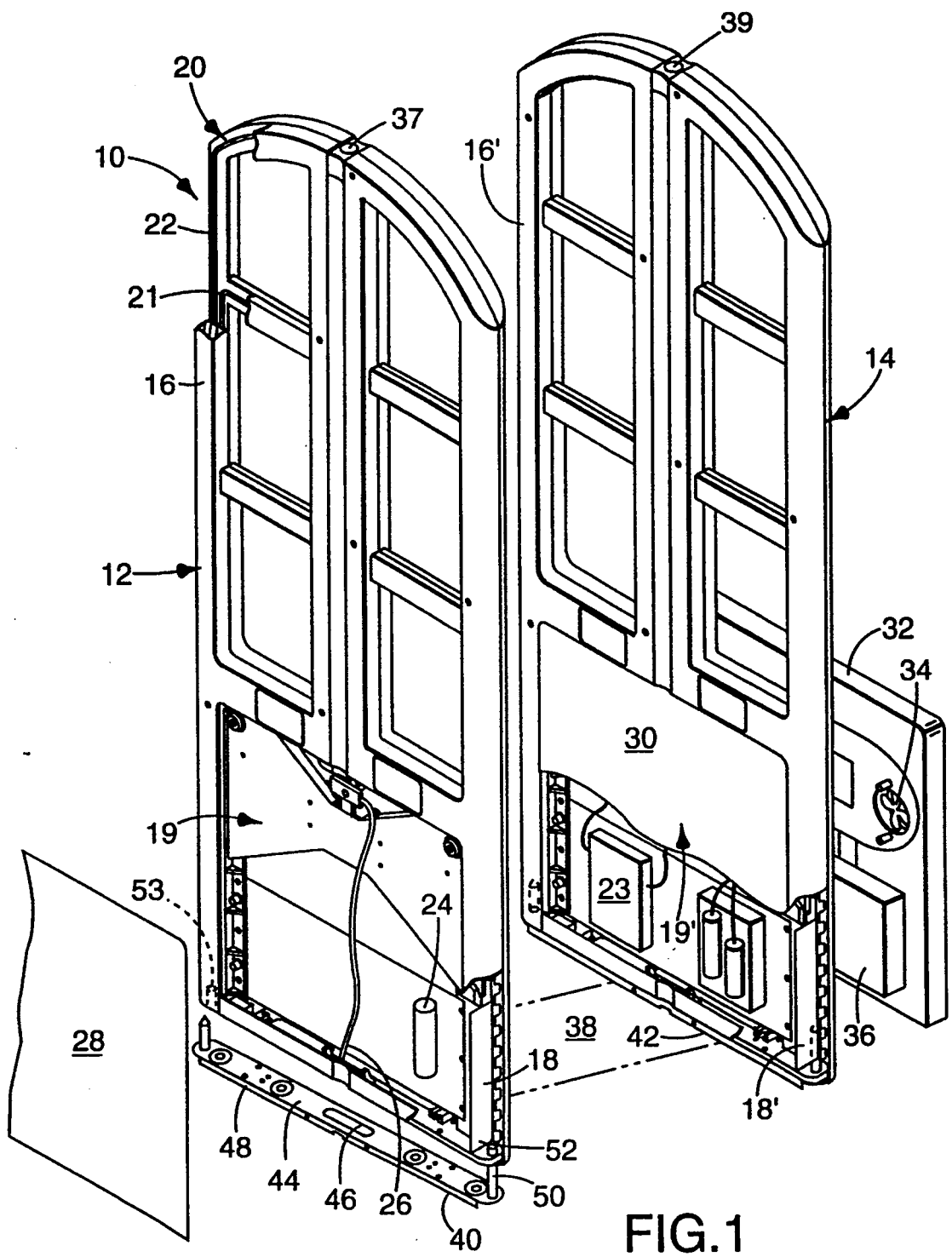
FIG. 1 is a partially cut away perspective view of a pair of lattice assemblies of a preferred embodiment of the present invention as used in a magnetic electronic article surveillance system installation.

FIG. 1 shows a partially broken-away perspective view of a magnetic electronic article surveillance (EAS) interrogator according to a preferred embodiment of the present invention. As there shown, such an interrogator 10 comprises two universal lattice assemblies 12 and 14, which are identical to each other, and within which may be installed specific electronic sub-assemblies. Each of the universal lattice assemblies 12 and 14 comprises a frame 16 or 16', a chassis 18 or 18', and a coil assembly 20, which preferably includes a field-producing coil 21 and a detector coil 22 (not shown on lattice assembly 14). Each of these respective components will be discussed in more detail hereinafter.

With respect to FIG. 1, the assembly 12 has installed within the middle section 19 portions of the EAS system electronics, such as capacitor 24. Both sides of that assembly may then be covered by flat, flush-fitting covers 28, so as not to impede passage next to the assembly. In a similar manner, the assembly 14 has attached to the inner side a flush-fitting cover 30, thereby maintaining a maximum corridor width. The outer side of the assembly, on the other hand, has mounted thereon an expanded cover 32 containing more bulky system components such as a cooling fan 34 and regulator circuits 36. Within the center section 19' are mounted signal processor circuits 23, etc. Connections from the respective circuits in either assembly to the various coil components, audible and visible alarms 37 and 39, respectively, may be made via a cable within the brace/raceway 38.

The respective lattice assemblies 12 and 14 are mounted via base members 40 and 42 to a respective floor surface. Such base units typically include a centrally positioned portion 44 with opening 46 to provide access for incoming electrical power leads and projections 48 contacting the floor surface, enabling the base to be mounted on a variety of floor coverings, carpets, tile and the like. As described in more detail hereinbelow, the bases also include a pair of vertically extending pins 50 and 51 which are adapted to be received into mating recesses 52 and 53 in the assemblies.

Figure 2:
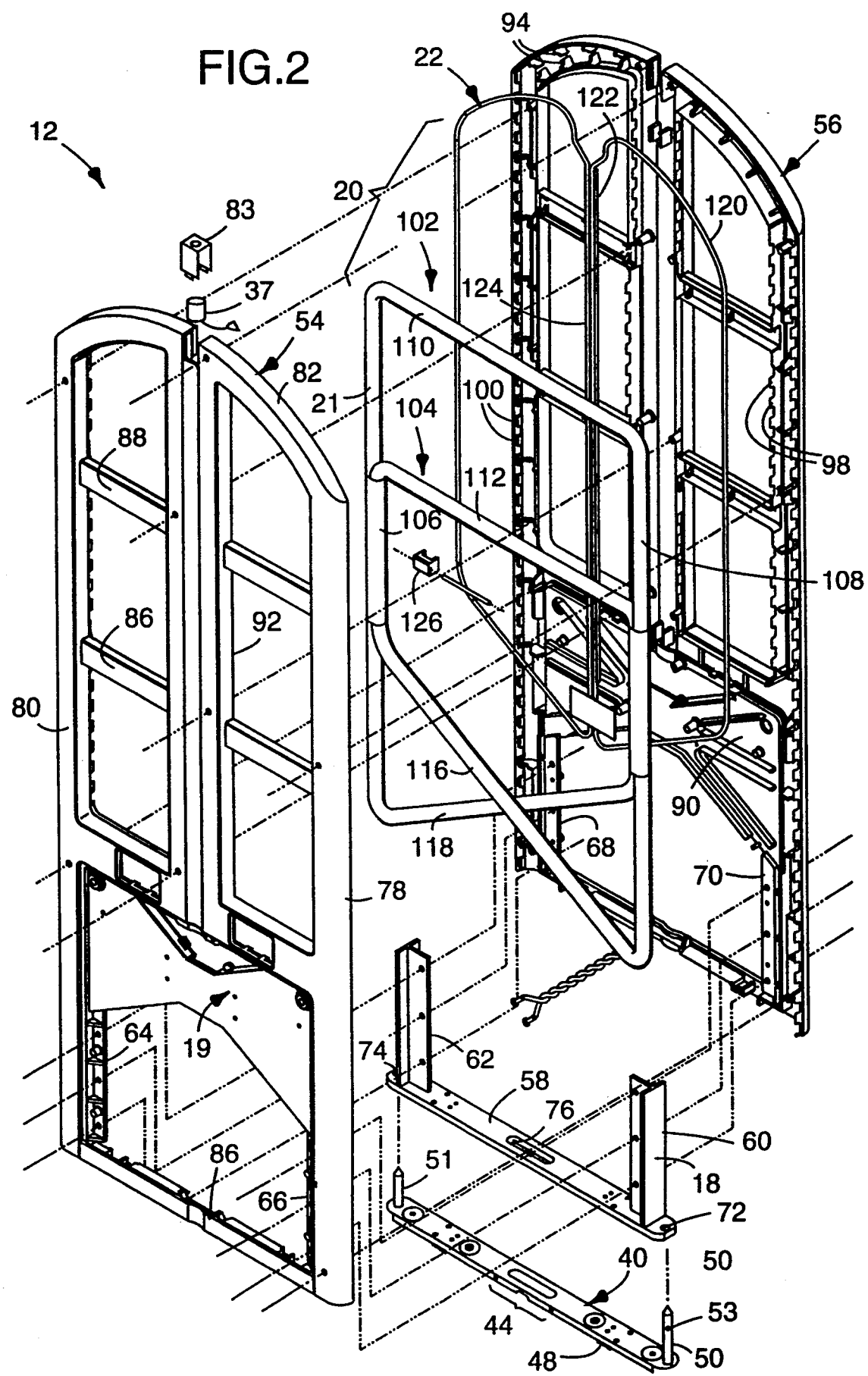
FIG. 2 is an exploded perspective view of a preferred lattice assembly of the present invention.

As shown in more detail in the exploded view of FIG. 2, a representative lattice assembly 12 includes two half-shells 54 and 56, which together make up the frame 16 shown in FIG. 1, the structural chassis 18, the coil assembly 20, and the base or foot pad 40.

The chassis 18 further comprises a bottom section 58 formed of a 0.5 inch (12.7 mm) thick aluminum plate, adapted to be secured to the floor mounted base 40. Opposing parallel side sections 60 and 62 formed of T-shaped aluminum beams are, in turn, welded to the bottom section 58. The side sections are adapted to be secured between mating flanges 64 and 66 on the lower leg of half-shell 54 and corresponding flanges 68 and 70 on half-shell 56. The bottom section 58 further has openings 72 and 74 to receive the mounting pins 50 and 51 and an opening 76 aligned with the opening 46 on the base 40.

The coil assembly 20 is further there seen to include the field-producing or drive coil 21 and detector coil 22.

The two identical, molded half-shells 54 and 56, when mated with the other, form opposing, spaced-apart vertical legs 78 and 80, a top, substantially horizontal section 82 connected across the top of the legs, and a middle section 19 connected between the legs and spaced upward of the bottom 86 thereof. Recesses are provided in the top section 82 for receiving an alarm 37 and cover 83. The shells further include at least one additional, substantially-horizontal section 86 extending between the legs intermediate between the top and bottom sections 82 and 84. Preferably, the frame includes at least two such upper horizontal sections, thus including an upper section 88. As shown, the middle section 19 of the frame includes variously angled ribs 90 adapted to receive a variety of coil configurations and defines a lower cavity for containing electronic components. A centermost vertical section 92 connected between the respective horizontal sections is also provided. The respective sections are interconnected and, thus, define the interior cavity within which the coils are anchored. As particularly visible in half-shell 56, the respective walls defining the cavity include projecting ribs 94 defining tapered recesses and saddles for receiving and rigidly anchoring the coil elements in place.

As also visible on half-shell 56, the frame includes a substantially continuous plurality of interlocking tapered tabs 98 and notches 100 extending around a major portion of the peripheries which are adapted to mate together when the half-shells are positioned facing each other and are pressed together. As the half-shells are identical, it will be recognized that the tabs 98 on one side of the half-shell are positioned to mate and form a taper lock with similarly positioned notches 100 on the other side, and vice versa. Thus, when two half-shells are positioned facing each other, all tabs are received by a matching notch. When appropriate screws are inserted, a completed lattice assembly of high integral strength is formed which is suitable for use in a hostile-user environment without requiring additional bonding of the respective members.

As shown in both FIGS. 1 and 2, the base or foot pad 40 includes a pair of vertically projecting pins 50 and 51. It is preferred that one of the pins 50 be approximately 4 inches shorter than the other, and may include an opening 53 in which another pin may be inserted to maintain the assembly in an elevated position. By so doing, installation of the lattices is considerably facilitated. For example, if the installation is to include a pair of lattices as shown in FIGS. 1 and 2, two base members 40 and 42 may be attached via the brace/raceway 38, thus forming a relatively stable platform. These three members may then be approximately positioned at a desired orientation, and the respective lattice assemblies may be set down over the pins 50 and 51. Electrical connections to the coil assemblies may be made so that the assemblies may be tested for electrical null and other system parameters. Once proper placement and operation has been verified, the lattice assemblies may be carefully raised to clear the shorter pin and rotated about the taller pin to clear the base members sufficiently to allow access thereto, allowing the members to be rigidly attached to a floor surface. When so attached, the lattice assemblies may be rotated back and lowered to the earlier established positions, thus retaining the desired electrical null, etc.

As further shown in FIG. 2, the coil assembly 20 desirably includes a field-producing coil 21 which includes at least a pair of substantially similarly configured coil segments 102 and 104 juxtaposed in substantially a coplanar orientation. Each coil segment has a pair of spaced apart and substantially vertical arms 106 and 108, a top, substantially horizontal section 110 and 112, respectively, connecting the upper ends of the vertical arms, and a bottom, at least partially diagonal section 116 and 118, respectively, connecting the lower end of the vertical arms. As there seen, the vertical arms of each coil segment are anchored within the cavity formed by the vertical legs of the frame, one of the respective top sections of the coil segments is anchored within the cavity formed by the horizontal frame section 88, and the other top coil segment is anchored within a cavity formed by a lower horizontal section 86 of the frame. The respective top coil segments are thereby located at different, predetermined heights. Preferably, the diagonal sections 116 and 118 of each coil segment are anchored within the cavity formed by the ribs 90 in the middle section of the frame, each diagonal being there positioned at an opposite diagonal angle with respect to the vertical arms.

Also as there shown, it is desired that at least the topmost section 82 of the frame be configured in a generally arched shape, and that the top section 120 of the detector coil 22 be anchored within the cavity formed by that topmost section 82. Desirably, the top section of the detector coil is thus positioned appreciably above the cavity within which the topmost horizontal section of the field-producing coil is anchored. The detector coil is also shown to include two sections connected in a lazy FIG. 8 configuration, thereby having two substantially vertically juxtaposed, but crossed-over, centermost sections 122 and 124. These sections are anchored within the cavity formed by the centermost vertical section 92 of the frame and are adjustable via the null mechanism 126.

Figure 3:
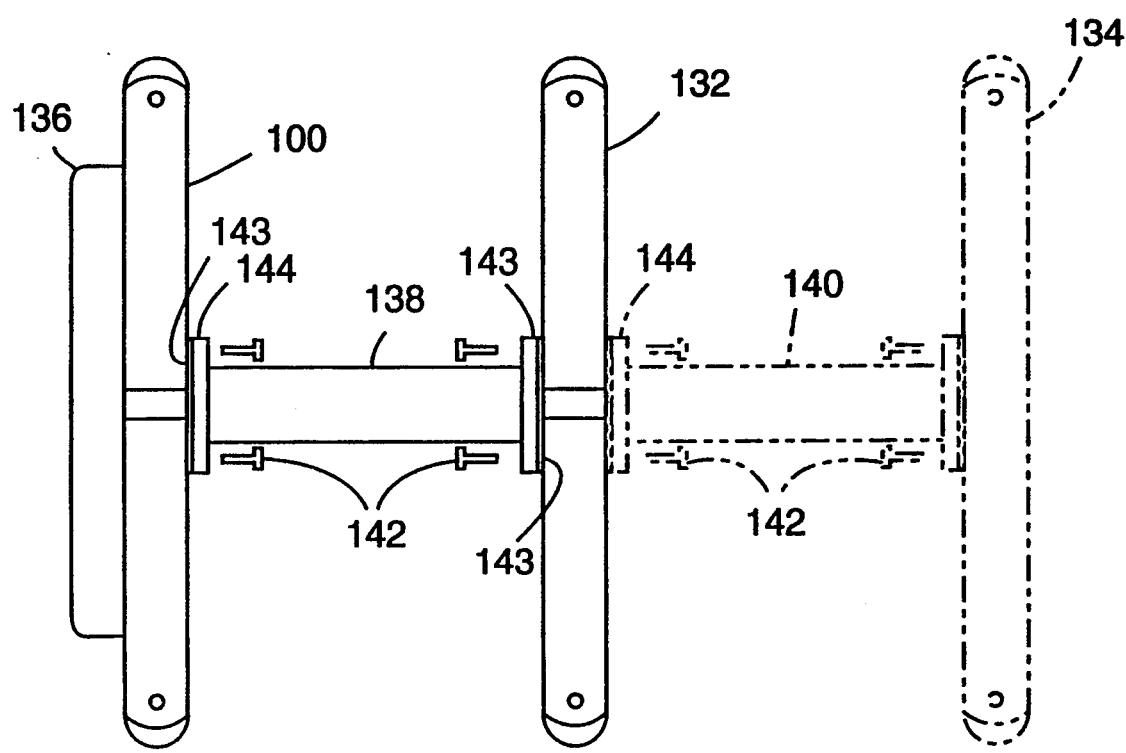
FIG. 3 is a top view of three lattice assemblies of the present invention positioned to provide dual interrogation zones.
Figure 4:
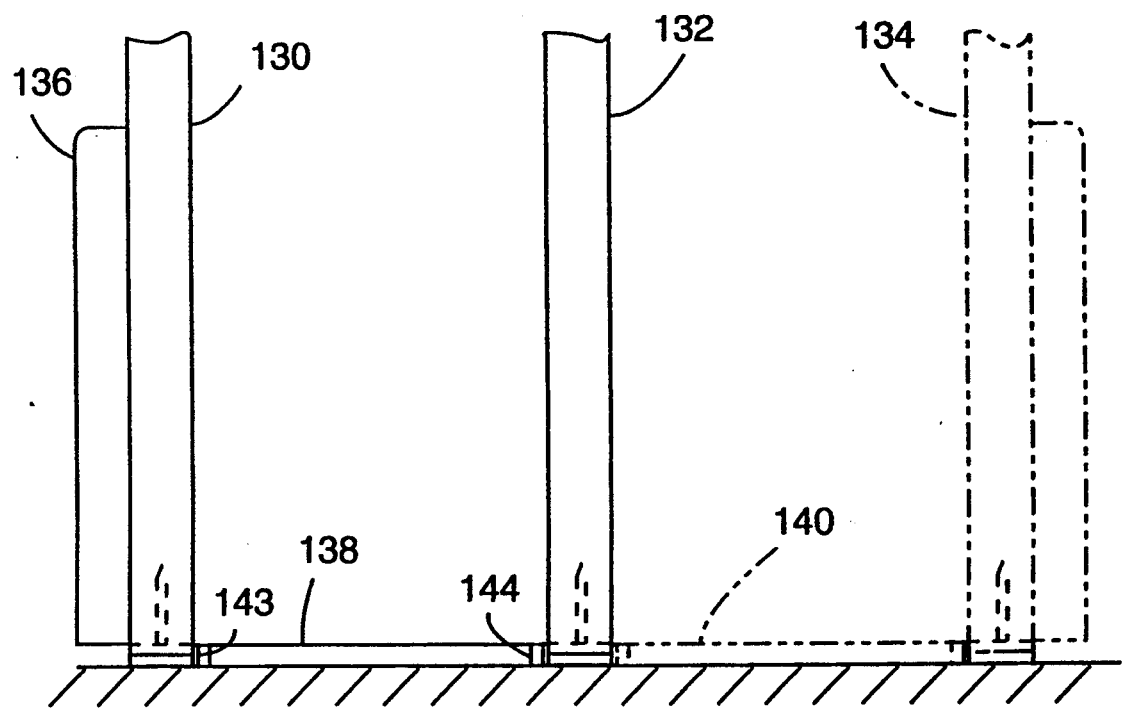
FIG. 4 is a front view of the lattice assemblies shown in FIG. 3.

Top views of a three-lattice assembly are shown in FIGS. 3 and 4 to include assemblies 130, 132 and 134, with only the outside of assembly 130 having mounted thereon an expanded cover 136, in which electronics controlling the coil assemblies in all three lattices are included. The lattices are shown to be coupled together by braces 138 and 140.

During installation, as discussed above, it may be desired that the assemblies be rigidly coupled together to facilitate alignment and positioning, such as by use of the bolts 142. However, it has also been found that such rigid coupling may not be desired during actual use, as a person walking on the brace may cause vibration, and that vibration may be coupled to the lattice assembly and thence to the coil assembly, causing a shift in the electrical balance. It is, therefore, preferred that after the initial installation, such that the lattices are rigidly anchored to the floor, the bolts 142 and shims 143 be removed. The assemblies and brace are thus isolated to prevent coupling of vibration.

Figure 5:
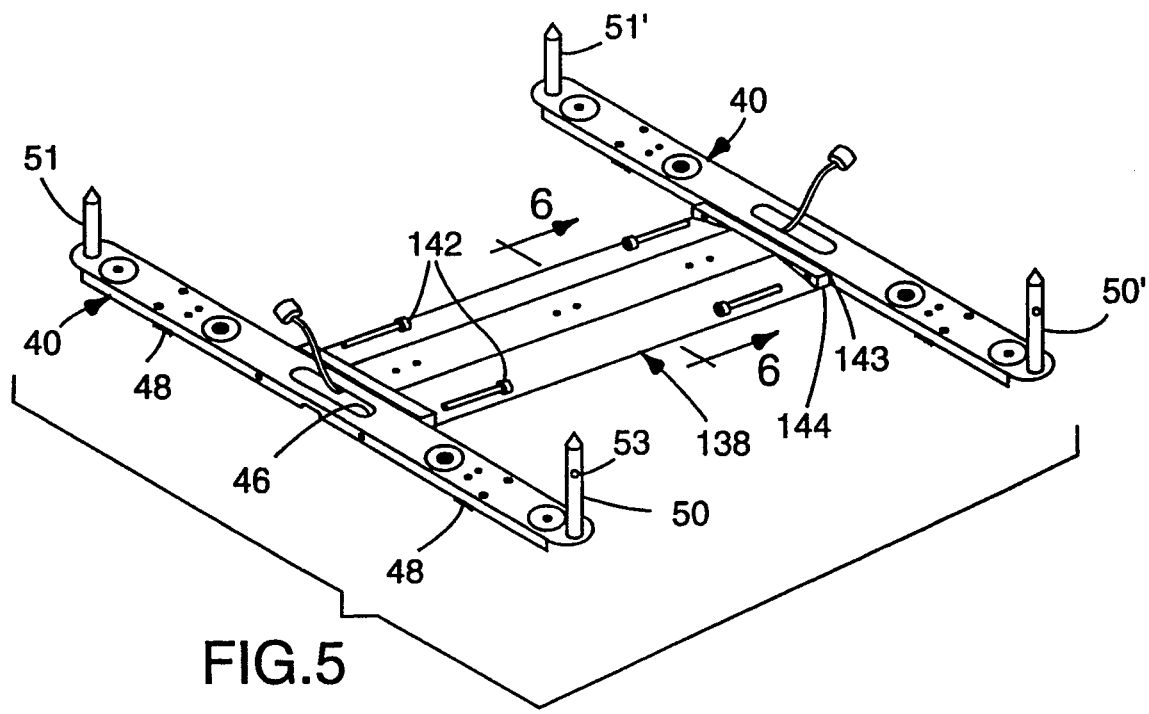
FIG. 5 is a perspective view of a brace for interconnecting the lattice assemblies of FIG. 1.
Figure 6:
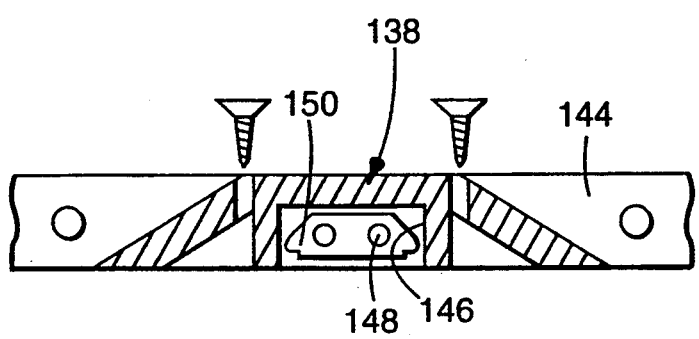
FIG. 6 is a cross-section of the brace shown in FIG. 5, taken along the line 6—6.

As shown in detail in FIG. 5, brace 138 may be positioned adjacent bases 40 and 42, and flanges 144 screwed to the bases with shims 143 therebetween, thus rigidly coupling the assemblage together. The cross-section of FIG. 6 further shows that the brace 138 desirably includes a raceway 146 within which interconnecting cables and conduits may be positioned.

The lattice assembly of the present invention is particularly desirably provided and inventoried in a disassembled state without specific coil assemblies, electronic sub-assemblies and covers in place, thereby decreasing the number of components which must be separately stocked. Upon receipt of an order for a particular EAS system and configuration, the requisite coils assemblies, electronic sub-assemblies may then be installed in the half-shells, the shells locked together, and covers put in place. The completed system is then in condition for shipping to a customer for installation.

While the use of a base member and interconnecting brace has been described hereinabove, it will be appreciated that other suitable mounting and connecting arrangements may be used. For example, the chassis may be attached directly to the floor or a large metal plate. Interconnecting wires may be fed below the floor, thereby eliminating any need for a raceway.

What is claimed is:

1. A universal lattice assembly for use with magnetic electronic article surveillance systems comprising:
   a) a structural chassis having a bottom section adapted to be secured to a base mounted on a floor, opposing parallel side sections secured to opposite ends of the bottom section, and having means for indexing and interlocking the chassis with other members of the assembly,
   b) a coil assembly comprising a drive coil and a detector coil; and
   c) a frame comprising two identical, molded half-shells, each half-shell, when mated with the other, forming
      i) opposing spaced-apart vertical legs,
      ii) a top section connected across the top of the legs,
      iii) a middle section connected between the legs and spaced upward of the bottom of the frame,
      iv) at least one additional section extending between the legs intermediate between the top and middle sections; and
      v) a centermost vertical section connected between the respective top, additional and middle sections and the bottom of said frame, said frame having an interior cavity extending through and connecting said vertical legs, said top section, said middle section, said at least one additional section and said centermost vertical section, and having means, within said interior cavity, for receiving and anchoring the coil assembly in place; and further comprising
      vi) a plurality of interlocking tabs and notches extending around a major portion of the periphery of each half-shell adapted to mate together when the half-shells are portioned facing each other and are pressed together, thereby attaching the respective half-shells together, and having means below the bottom of the frame adapted to receive associated electronic sub-assemblies and to mate with members of the chassis, the mating of the chassis and half-shells making up the frame, thereby forming a completed composite lattice assembly of a strength suitable for use in a hostile-user environment without requiring additional bonding of the chassis and the half-shells.

2. A lattice assembly according to claim 1, further comprising a foot pad comprising means for mounting said pad on a floor surface and means for receiving and anchoring thereon said chassis.

3. A lattice assembly according to claim 2, wherein said receiving and anchoring means of the foot pad further comprises a pair of upward projecting structural support pins adapted to be received into matching apertures in the chassis.

4. A lattice assembly according to claim 3, wherein said support pins are of unequal length, enabling the assembled frame and chassis to be temporarily positioned on the foot pad, adjusted for operation, and moved away from the shorter pin, allowing the pad to then be permanently attached to the floor.

5. A lattice assembly according to claim 1, wherein said coil assembly includes at least a pair of similarly configured coil segments juxtaposed in coplanar orientation, each coil segment having a pair of spaced-apart vertical arms each having an upper and a lower end, a top section connecting the upper ends of the vertical arms, and a bottom, at least partially diagonal section connecting the lower ends of the vertical arms, wherein the vertical arms of each coil segment are anchored within the cavity formed by the vertical legs of the frame, and further wherein the top section of one of the coil segments is anchored within a cavity formed by the top section of the frame and the top section of an other one of the top coil segments is anchored within a cavity formed by a lower section of the frame, the top coil segments thereby being located at different, predetermined height.

6. A lattice assembly according to claim 5, wherein the diagonal section of each coil segment is anchored within the cavity formed by the middle section of the frame, each diagonal being there positioned at an opposite diagonal angle with respect to the vertical arms.

7. A lattice assembly according to claim 1, wherein at least the top section is configured in a arched shape, and wherein a top section of said detector coil is anchored within the cavity formed by said topmost section of the frame.

8. A lattice assembly according to claim 7, wherein said detector coil comprises two sections connected in a lazy FIG. 8 configuration, thereby having two substantially vertical juxtaposed, but crossed-over, centermost sections, which sections are anchored within the cavity formed by the centermost vertical section of the frame.

9. A lattice assembly according to claim 8, wherein the top section of the detector coil is anchored within a cavity extending above the cavity within which the top section of said detector coil is anchored.

10. A lattice assembly according to claim 1, further comprising a structural brace adapted to interconnect a second said lattice assembly to a first lattice assembly, said brace including means for at least temporarily rigidly connecting the lattices to stabilize the assemblage during installation.

11. A lattice assembly according to claim 10, wherein said brace comprises a raceway adapted to cover and protect wires connecting said first and second the lattice assemblies during actual use.

12. A lattice assembly according to claim 10, wherein said brace includes a temporary spacer adapted to fit between a said lattice and the brace during installation, allowing connection therebetween and to thereafter be removed, thereby isolating the lattice assembly from the brace to prevent vibration as may be imparted to the brace from being transmitted to the lattice assemblies.

13. A lattice assembly according to claim 1, further comprising at least one electronic circuit secured to said middle section.

14. A lattice according to claim 13, wherein said circuits are mounted within an expanded housing adapted to be attached to said middle section on the side away from that defining an interrogation zone corridor, thereby leaving the corridor side flush so as not to impede the passageway therealong.

15. A lattice assembly according to claim 1, wherein each said half shell comprises outer walls, said cavity within the half-shells being parallel to the walls thereby allowing a field-producing coil to be positioned directly opposite an outer wall, thereby maximizing an interrogation zone's effective width, the interrogation zone extending between adjacent lattice assemblies.

16. A lattice assembly according to claim 1, wherein said means for receiving and anchoring includes projecting ribs defining tapered recesses within which coil members may be wedged and saddles on which other coil members may be positioned.

* * * * *